US008457214B2

(12) United States Patent
Baird et al.

(10) Patent No.: US 8,457,214 B2
(45) Date of Patent: Jun. 4, 2013

(54) VIDEO COMPOSITING OF AN ARBITRARY NUMBER OF SOURCE STREAMS USING FLEXIBLE MACROBLOCK ORDERING

(75) Inventors: Randall B. Baird, Austin, TX (US); Arturo A. Rodriguez, Norcross, GA (US)

(73) Assignee: Cisco Technology, Inc., San Jose, CA (US)

( * ) Notice: Subject to any disclaimer, the term of this patent is extended or adjusted under 35 U.S.C. 154(b) by 1523 days.

(21) Appl. No.: 11/900,189

(22) Filed: Sep. 10, 2007

(65) Prior Publication Data
US 2009/0067507 A1 Mar. 12, 2009

(51) Int. Cl.
H04N 7/12 (2006.01)
(52) U.S. Cl.
USPC ............ 375/240.26; 375/240.24; 375/E7.088
(58) Field of Classification Search
USPC ..................................... 375/240.24
See application file for complete search history.

(56) References Cited

U.S. PATENT DOCUMENTS

| 5,444,491 | A | 8/1995 | Lim ............................. 348/441 |
| 5,508,746 | A | 4/1996 | Lim ............................. 348/429 |
| 5,742,343 | A | 4/1998 | Haskell et al. ................ 348/415 |
| 5,923,820 | A * | 7/1999 | Cunnagin et al. ............. 358/1.8 |
| 6,208,382 | B1 | 3/2001 | Glenn .......................... 348/448 |
| 6,337,716 | B1 | 1/2002 | Yim ............................. 348/554 |
| 6,353,613 | B1 | 3/2002 | Kubota et al. | |
| 6,757,911 | B1 | 6/2004 | Shimoji et al. | |
| 6,801,575 | B1 | 10/2004 | Crinon ..................... 375/240.26 |
| 7,020,205 | B1 | 3/2006 | Beyers et al. ............ 375/240.26 |
| 7,366,462 | B2 | 4/2008 | Murali et al. | |
| 7,672,377 | B2 * | 3/2010 | Heng et al. ................ 375/240.16 |
| 7,693,220 | B2 * | 4/2010 | Wang et al. ................. 375/240.2 |
| 7,747,921 | B2 * | 6/2010 | DaCosta ....................... 714/748 |

(Continued)

FOREIGN PATENT DOCUMENTS

| EP | 0 608 092 A2 | 7/1994 |
| EP | 1 182 877 A2 | 2/2002 |

(Continued)

OTHER PUBLICATIONS

Bergeron, Cyril; Lamy-Bergot, Catherine. Soft-input Decoding of Variable-Length Codes Applied to the H.264 Standard. IEEE 6th Workshop on Multimedia Signal Processing. Pub. Date: 2004. Relevant pp. 87-90. Found on the World Wide Web at: http://ieeexplore.ieee.org/stamp/stamp.jsp?tp=&arnumber=1436425.*

(Continued)

*Primary Examiner* — Nathan Flynn
*Assistant Examiner* — Jeremiah Avery
(74) *Attorney, Agent, or Firm* — Merchant & Gould

(57) ABSTRACT

In one embodiment, a system includes a compositor operable to receive a plurality of source video streams, each containing source images, and to convert each of the source video streams into source slice groups using flexible macroblock ordering (FMO). The compositor is further operable to add pad slice groups to the source slice groups to create a composite image, and reorder the source slice groups and pad slice groups into a single composite output stream. A device receives the single composite output stream and displays the composite image as a rectangular picture that has a size larger than that of any of the source images. It is emphasized that this abstract is provided to comply with the rules requiring an abstract that will allow a searcher or other reader to quickly ascertain the subject matter of the technical disclosure.

21 Claims, 6 Drawing Sheets

U.S. PATENT DOCUMENTS

| | | | |
|---|---|---|---|
| 2001/0006404 A1 | 7/2001 | Yun | |
| 2002/0054638 A1 | 5/2002 | Hanamura et al. | |
| 2002/0075954 A1 | 6/2002 | Vince | 375/240.01 |
| 2002/0162114 A1 | 10/2002 | Bisher et al. | |
| 2004/0240860 A1 | 12/2004 | Bruls et al. | |
| 2004/0244059 A1 | 12/2004 | Coman | 725/139 |
| 2004/0264931 A1 | 12/2004 | Nakashika et al. | |
| 2005/0015794 A1 | 1/2005 | Roelens | |
| 2005/0210523 A1 | 9/2005 | Parnell et al. | 725/97 |
| 2006/0023748 A1 | 2/2006 | Chandhok et al. | 370/469 |
| 2006/0083308 A1* | 4/2006 | Schwarz et al. | 375/240.16 |
| 2006/0146734 A1* | 7/2006 | Wenger et al. | 370/260 |
| 2006/0271990 A1 | 11/2006 | Rodriguez et al. | 725/118 |
| 2007/0206673 A1* | 9/2007 | Cipolli et al. | 375/240.1 |
| 2008/0037656 A1* | 2/2008 | Hannuksela | 375/240.26 |
| 2009/0103605 A1 | 4/2009 | Rodriguez et al. | 375/240.01 |
| 2009/0103634 A1 | 4/2009 | Rodriguez et al. | 375/340.26 |
| 2009/0106812 A1 | 4/2009 | Rodriguez et al. | 725/131 |
| 2009/0106814 A1 | 4/2009 | Rodriguez et al. | 725/151 |
| 2009/0122183 A1 | 5/2009 | Rodriguez et al. | 348/446 |
| 2009/0122184 A1 | 5/2009 | Rodriguez et al. | 348/446 |
| 2009/0122185 A1 | 5/2009 | Rodriguez et al. | 348/446 |
| 2009/0122186 A1 | 5/2009 | Rodriguez et al. | 348/446 |
| 2009/0122190 A1 | 5/2009 | Rodriguez et al. | 348/500 |
| 2009/0122858 A1 | 5/2009 | Rodriguez et al. | 375/240.01 |
| 2009/0141794 A1 | 6/2009 | Rodriguez et al. | 375/240.01 |
| 2009/0144796 A1 | 6/2009 | Rodriguez et al. | 725/118 |
| 2009/0154553 A1 | 6/2009 | Rodriguez et al. | 375/240.01 |

FOREIGN PATENT DOCUMENTS

| | | |
|---|---|---|
| WO | WO 91/07847 A1 | 5/1991 |
| WO | WO 01/76245 A2 | 10/2001 |
| WO | WO 03/026300 A | 3/2003 |
| WO | WO 2006/125052 A1 | 11/2006 |
| WO | WO 2007/076486 A | 7/2007 |

OTHER PUBLICATIONS

U.S. Official Action mailed Oct. 27, 2009 in U.S. Appl. No. 11/132,060.
U.S. Official Action mailed Nov. 13, 2009 in U.S. Appl. No. 12/342,938.
U.S. Non-Final Official Action mailed Nov. 8, 2010 in U.S. Appl. No. 11/132,060.
Schwarz et al., "Overview of the Scalable Video Coding Extension of the H.264/AVC Standard," IEEE Transactions on Circuits and Systems for Video Technology, IEEE Service Center, Piscataway,NJ,US, vol. 17, Sep. 9, 2007, pp. 1103-1120, XP011193019.
Wiegand et al., "Overview of the H.264/AVC Video Coding Standard," IEEE Transactions on Circuits and Systems for Video Technology, vol. 13, Jul. 7, 2003, pp. 560-576, XP002509016.
European Examination dated Jan. 21, 2011 in Application No. 08 830 482.9, 3 pages.
U.S. Final Official Action mailed Mar. 21, 2011 in U.S. Appl. No. 12/342,576.
U.S. Final Official Action mailed Mar. 24, 2011 in U.S. Appl. No. 12/342,938.
U.S. Non-Final Official Action mailed Apr. 1, 2011 in U.S. Appl. No. 12/342,572.
U.S. Final Official Action mailed Apr. 1, 2011 in U.S. Appl. No. 12/342,824.
U.S. Final Official Action mailed Apr. 6, 2011 in U.S. Appl. No. 12/342,567.
U.S. Final Official Action mailed Apr. 13, 2011 in U.S. Appl. No. 12/342,582.
U.S. Non-Final Official Action mailed May 3, 2011 in U.S. Appl. No. 12/342,914.
U.S. Non-Final Official Action mailed May 12, 2011 in U.S. Appl. No. 12/342,934.
U.S. Official Action mailed May 10, 2010 in U.S. Appl. No. 11/132,060.
U.S. Final Official Action mailed Apr. 13, 2010 in U.S. Appl. No. 12/342,934.
U.S. Final Office Action mailed Apr. 9, 2010 in U.S. Appl. No. 12/342,914.
U.S. Final Official Action mailed May 11, 2010 in U.S. Appl. No. 12/342,938.
U.S. Non-Final Official Action mailed Oct. 14, 2010 in U.S. Appl. No. 12/342,567.
U.S. Non-Final Official Action mailed Oct. 1, 2010 in U.S. Appl. No. 12/342,572.
U.S. Non-Final Official Action mailed Oct. 6, 2010 in U.S. Appl. No. 12/342,576.
U.S. Non-Final Official Action mailed Sep. 28, 2010 in U.S. Appl. No. 12/342,582.
U.S. Non-Final Official Action mailed Oct. 15, 2010 in U.S. Appl. No. 12/342,824.
U.S. Official Action mailed Sep. 16, 2010 in U.S. Appl. No. 12/342,914.
U.S. Non-Final Official Action mailed Sep. 28, 2010 in U.S. Appl. No. 12/342,934.
U.S. Official Action mailed Oct. 8, 2010 in U.S. Appl. No. 12/342,938.
U.S. Appl. No. 11/132,060, filed May 18, 2005, entitled "Higher Picture Rate HD Encoding and Transmission with Legacy HD Backward Compatibility".
U.S. Appl. No. 12/342,567, filed Dec. 23, 2008, entitled "Providing Video Programs with Identifiable and Manageable Video Streams".
U.S. Appl. No. 12/342,569, filed Dec. 23, 2008, entitled "Receiving and Processing Multiple Streams Associated with a Video Program".
U.S. Appl. No. 12/342,572, filed Dec. 23, 2008, entitled "Providing Complementary Streams of a Program Coded According to Different Compression Methods".
U.S. Appl. No. 12/342,576, filed Dec. 23, 2008, entitled "Providing Identifiable Video Streams of Different Picture Formats".
U.S. Appl. No. 12/342,582, filed Dec. 23, 2008, entitled "Providing Video Streams of a Program with Different Stream Type Values Coded According to the Same Video Coding Specification".
U.S. Appl. No. 12/342,824, filed Dec. 23, 2008, entitled "Adaptive Processing of Programs with Multiple Video Streams".
U.S. Appl. No. 12/342,875, filed Dec. 23, 2008, entitled "Video Processing Impermeable to Additional Video Streams of a Program".
U.S. Appl. No. 12/342,914, filed Dec. 23, 2008, entitled "Processing Different Complementary Streams of a Program".
U.S. Appl. No. 12/342,934, filed Dec. 23, 2008, entitled "Processing Video Streams of a Different Picture Formats".
U.S. Appl. No. 12/342,938, filed Dec. 23, 2008, entitled "Era-Dependent Receiving and Processing of Programs with One or More Video Streams".
U.S. Appl. No. 12/342,946, filed Dec. 23, 2008, entitled "Processing Identifiable Video Streams of a Program According to Stream Type Values".
U.S. Appl. No. 12/343,032, filed Dec. 23, 2008, entitled "Providing a Video Stream with Alternate Packet Identifiers".
U.S. Appl. No. 12/343,059, filed Dec. 23, 2008, entitled "Receiving and Separating an Encoded Video Stream into Plural Encoded Pictures with Different Identifiers".
U.S. Official Action mailed Jun. 2, 2008 in U.S. Appl. No. 11/132,060.
U.S. Official Action mailed Mar. 20, 2009 in U.S. Appl. No. 11/132,060.
U.S. Official Action mailed Sep. 30, 2009 in U.S. Appl. No. 12/342,934.
U.S. Official Action mailed Sep. 30, 2009 in U.S. Appl. No. 12/342,914.
Bayrakeri S et al., "MPEG-2/ECVQ Lookahead Hybrid Quantization and Spatially Scalable Coding" The SPIE, Bellingham WA., vol. 3024, pp. 129-137, Published: Jan. 10, 1997.
PCT Search Report mailed Oct. 24, 2006 in PCT/US2006/019181.
PCT Written Opinion mailed Oct. 24, 2006 in PCT/US2006/019181.

* cited by examiner

VIDEO COMPOSITING OF AN ARBITRARY NUMBER OF SOURCE STREAMS USING FLEXIBLE MACROBLOCK ORDERING

TECHNICAL FIELD

The present disclosure relates generally to the field of video data transmissions over digital networks.

BACKGROUND

The ever-increasing demand for multimedia content on end-user devices combined with the limited bandwidth available to deliver that content has lead to the development of very efficient and highly robust video coding algorithms. For example, the H.264/AVC (Advanced Video Coding) digital video coding standard written by the International Telecommunication Union (ITU) Video Coding Experts Group (VCEG) together with the International Organization for Standardization ISO/International Electrotechnical Commission (IEC) IEC Moving Picture Experts Group (MPEG) is widely known for its ability to provide high quality video in error prone environments. The emerging scalable extension of H.264/AVC, known as H.264/SVC (Scalable Video Coding) defines a scalable video bitstream that contains a non-scaleable base layer and one or more enhancement layers.

The H.264 standard contains a feature called Flexible Macroblock Ordering (FMO) that allows multiple "distinct slice groups" to be created in an H.264 picture in such a way that no macroblock (a block of 16×16 pixels) is surrounded by any other macroblock from the same slice group. Inside a slice group all macroblocks are ordered in raster scan order. Basically, each slice group is like its own little mini-picture. For instance, one slice group can be intracoded while a neighboring group can be predictively coded from the same corresponding slice group in a reference picture. The FMO feature makes it possible to take independent contributing streams from multiple sources and combine the streams together into one stream of composited pictures, say, for video conferencing.

BRIEF DESCRIPTION OF THE DRAWINGS

The present invention will be understood more fully from the detailed description that follows and from the accompanying drawings, which however, should not be taken to limit the invention to the specific embodiments shown, but are for explanation and understanding only.

DESCRIPTION OF EXAMPLE EMBODIMENTS

Figure 1:
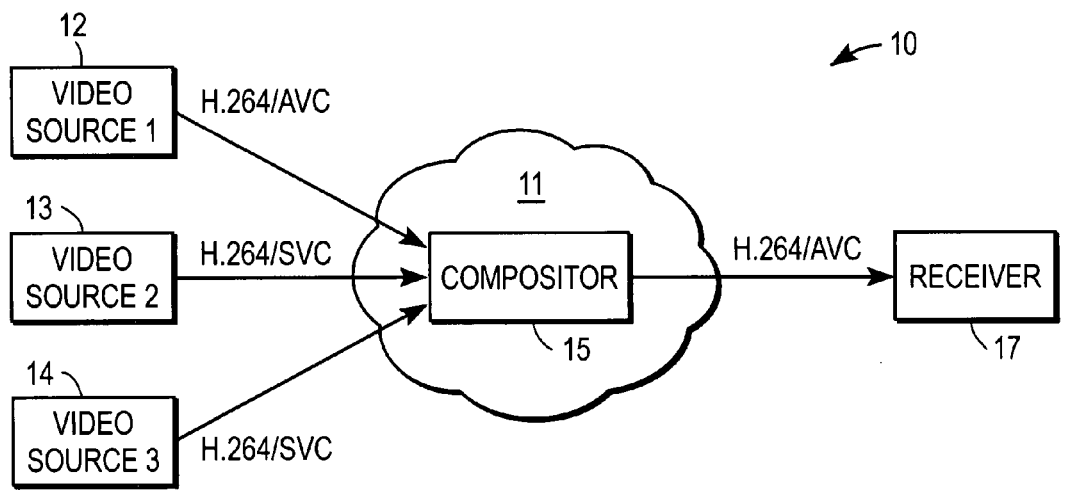
FIG. 1 illustrates an example video communications system.

In the following description specific details are set forth, such as device types, system configurations, protocols, applications, methods, etc., in order to provide a thorough understanding of the disclosure herein. However, persons having ordinary skill in the relevant arts will appreciate that these specific details may not be needed to practice the embodiments described.

In the context of the present application, a computer network is a geographically distributed collection of interconnected subnetworks for transporting data between nodes, such as intermediate nodes and end nodes (also referred to as endpoints). A local area network (LAN) is an example of such a subnetwork; a plurality of LANs may be further interconnected by an intermediate network node, such as a router, bridge, or switch, to extend the effective "size" of the computer network and increase the number of communicating nodes. Examples of the devices or nodes include servers, mixers, control units, and personal computers. The nodes typically communicate by exchanging discrete frames or packets of data according to predefined protocols.

A video receiver device represents any equipment, node, terminal, or other device capable of receiving, decoding, or rendering a digital video image therefrom. Examples of video receiver devices include a video appliance (e.g., a video monitor, etc.), a personal digital assistant (PDA); a personal computer (PC), such as notebook, laptop, or desktop computer; a television device, set-top box (STB), cellular phone, video phone, or any other device, component, element, or object capable of receiving, decoding, or rendering digital video images.

A video stream, such as a contributing stream or source stream, is a sequence of pictures encoded in accordance to a video coding specification, such as ITU H.264. A video coding specification may allow a video source to be encoded without incremental enhancement layers corresponding to SVC. An H.264/SVC stream herein refers to a video stream that contains at least one enhancement layer in addition to a base layer of coded video.

A video compositor ("compositor" for short) is any device capable of receiving two or more digital video input streams and combining them into a single digital video output stream with minimal, or without performing, decoding or re-encoding operations below the slice layer on any of the constituent streams.

Arbitrary Slice Ordering (ASO) is a technique for restructuring the ordering of macroblocks in pictures that obviates the need to wait for a full set of pictures to arrive from all sources.

Overview

In one embodiment, a video compositor receives multiple video source streams. The source streams may comprise H.264/AVC streams, H.264-SVC streams, or a combination of H.264/AVC and H.264/SVC streams. Other types of streams compatible with the H.264 standard, such as future enhancements or extensions to the existing definitions, may also be received as inputs to the video compositor. The compositor first processes the existing H.264 headers from each source stream to provide proper information in the produced combined stream. Headers are removed from the source streams as necessary but some of the parsed or interpreted information is retained or modified as necessary to affect composited pictures in the combined stream. Processed header information may include slice headers, picture parameters sets, sequence parameter sets, and Network Abstraction Layer (NAL) headers.

The encoded macroblocks from each of the streams are preserved and are added to a picture with a picture parameter set (PPS) that identifies them as part of a larger composite picture containing multiple slice groups. Since each contributing stream is a sequence of pictures, the compositor produces a sequence of composited pictures, each composited picture for a corresponding time interval in sequential time intervals. Composition is performed in a manner that enables a visually synchronized presentation of the combined stream when decoded and displayed. The sequential progression of compositing pictures from contributing streams may be according to pictures having a transmission or presentation time within the time interval corresponding to a composition operation. The associated time with a picture may be expressed, for example, as a time stamp relative to a reference clock. In one implementation, only pictures with an associated time within a corresponding time interval are composited. In one embodiment, only pictures with an associated time within the corresponding time interval are composited.

Using FMO and ASO techniques, the incoming pictures can be combined in a time-consistent manner to produce streams of composited pictures. ASO provisions the respective portions of a composited picture to be transmitted or decoded in a particular order, e.g., raster scan order. Hence, the individual source streams do not need to be delayed to wait for pictures from the other sources to arrive. Note that all composition operations occur in the coded domain. By performing only limited modification of the streams using FMO and ASO techniques, the latency of the compositor is kept at an acceptable delay. In one embodiment the raster scan order of the contributing streams in the composited picture is maintained up to the latency amount that does not supersede the latency of a typically video switch (e.g., less than 20 milliseconds).

In accordance with one embodiment, any number of two or more source video streams may be composited together. Additionally, source streams having varying resolutions, aspect ratios, etc., may be composited together to form a single, larger picture. In a specific embodiment, the compositor further combines contributing streams of different profiles into a single profile.

In another embodiment, the maximum number of contributing streams for composition is set to a predetermined threshold. If the number of contributing streams exceed the threshold, certain contributing streams with the same picture resolution and/or AVC characteristics are adjoined side-by-side, or on top of each other, as a slice group.

FIG. 1 illustrates an example video communications system 10 that shows a video compositor 15 located on IP network 11 receiving three incoming video source streams: an H.264/AVC stream produced by video source 12 ($Source_1$), an H.264/AVC stream produced by video source 13 ($Source_2$), and an H.264/SVC stream produced by video source 14 ($Source_3$). IP video terminals connected via an H.320 leg. In this embodiment, compositor 15 produces a single, larger H.264/AVC compatible picture that has the source pictures pieced or composed together. The single, larger H.264/AVC compatible picture is shown being sent as a single transport stream to a receiver (e.g., video terminal) 17. By way of example, video terminal 17 may comprise personal computer (PC) that includes standard audio and video codecs, and which is operable to render a video image or picture from the received H.264/AVC stream.

It is appreciated that in the embodiment of FIG. 1, no scaling of the source images need be performed. In the event that the three pieced-together source pictures do not form a complete, continuous rectangle, one or more additional "pad" slice groups may be added to form the single, larger composite picture output to receiver 17. The pad slice groups may comprise a blank, or single color, or other type of image that is used to fill a region of the composed output picture so that the larger output picture is formed with a rectangular shape. Practitioners in the art will further appreciate that with respect to the H.264-SVC stream, the video compositor can reduce the scale of the stream, thereby allowing the overall bit rate of the composition to be controlled.

Figure 2A:
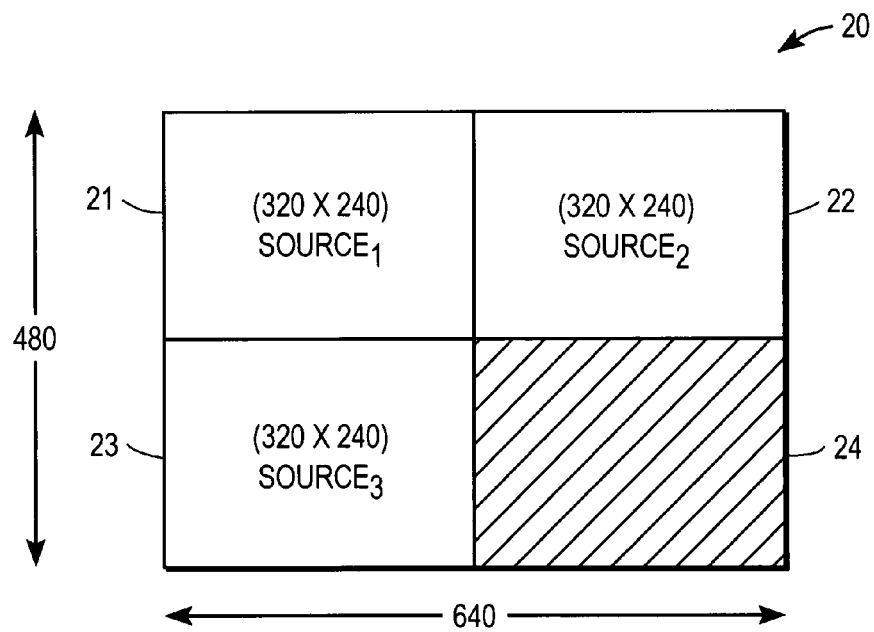
FIG. 2A illustrates an example composite picture produced by the compositor of FIG. 1.

The use pad slice groups is illustrated in FIG. 2A, which shows an example composite picture 20 produced by video compositor 15 of FIG. 1. As can be seen, the three video sources, $Source_{1-3}$, respectively produce regions or areas 21-23 of the composite picture, with each area having a size of 320×240 pixels in accordance with the picture size of the source streams. But because only three source pictures are included, the compositor creates a fourth area 24 comprising a pad slice group that may be coded using either a constant blank color or, alternatively, some kind of constant-image splash screen to produce a composite picture that has a rectangular shape of 640×480 pixels (VGA-sized). Since picture 24 is composed as a plurality of slice groups using FMO and ASO techniques, area 24 may comprise a single pad slice. Practitioners in the art will understand that pad slice groups that form background or fill regions of a larger composite picture may be intra-coded once.

Figure 2B:
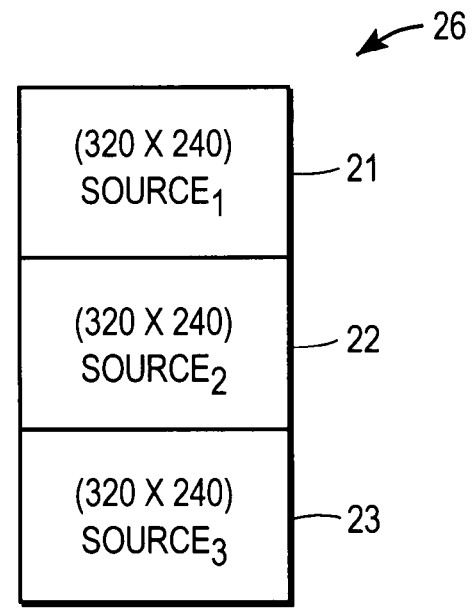
FIG. 2B illustrates another example composite picture produced by the compositor of FIG. 1.

Depending on the sophistication level of receiver 17, composite picture 20 may be rendered as shown in FIG. 2A or, alternatively into a 320×720 picture 26 (shown in FIG. 2B) or a 960×240 picture (not shown). Note that since composite picture 20 is larger than each of the originating source pictures, the receiver codecs may need to negotiate higher bit rates to receive the composite image. However, the actually coded picture is still completely H.264-AVC conformant, meaning that it should be decodable by most, if not all, existing decoders. More advanced decoders may take the resulting image and scale it as needed for rendering.

By way of further example, five video sources consisting of one Common Image Format (CIF) image (352×288 pixels) and four Quarter CIF (QCIF) images (each 176×144 pixels) may be pieced together by the compositor of FIG. 1 to form a single VGA-sized image (640×480 pixels).

Figure 3A:
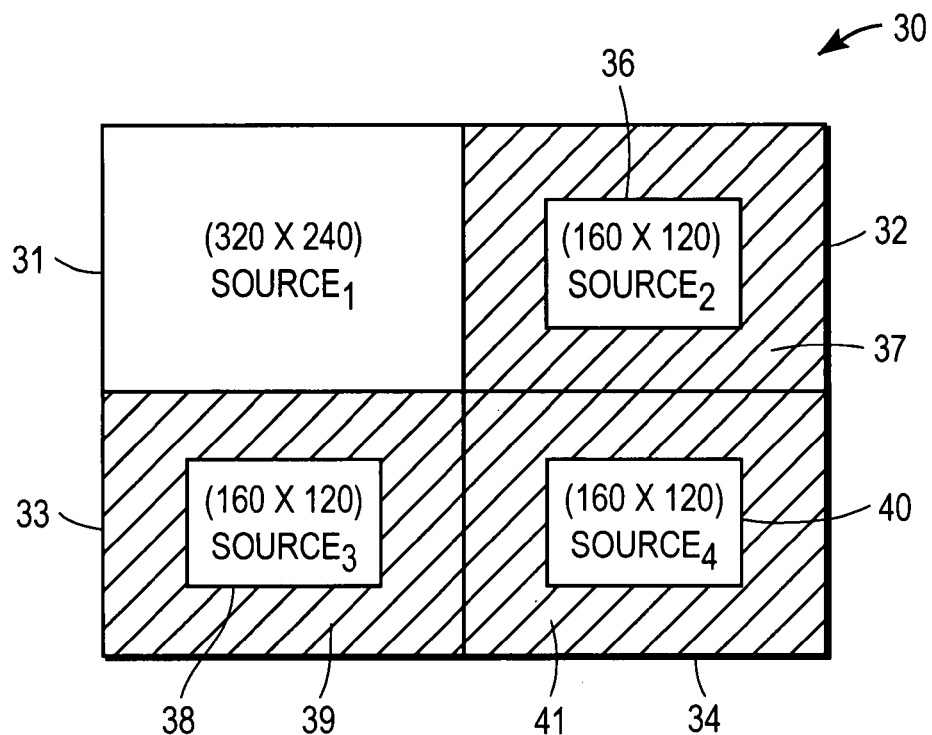
FIG. 3A illustrates an example composite picture produced by the compositor of FIG. 1.

FIG. 3A illustrates another example composite picture 30 produced by the compositor of FIG. 1. As in the previous examples, the video compositor converts the source images into slice groups of a larger image, and then adds "pad slice groups" to create an image compatible with the existing H.264-AVC standard. Picture 30 of FIG. 3A is a single VGA-sized image (640×480 pixels) composed of four source pictures: a single 320×240 picture ($Source_1$) that is located in upper left-hand area 31, and three 160×120 pictures 36, 38 and 40 ($Source_{2-4}$) that are positioned within areas 32-34, respectively, of picture 30. Cross-hatched regions 37, 39 and 41 comprise lossless encoded backgrounds for respective source images 36, 38 and 40. Note that each slice group is coded independent of every other slice group.

Figure 3B:
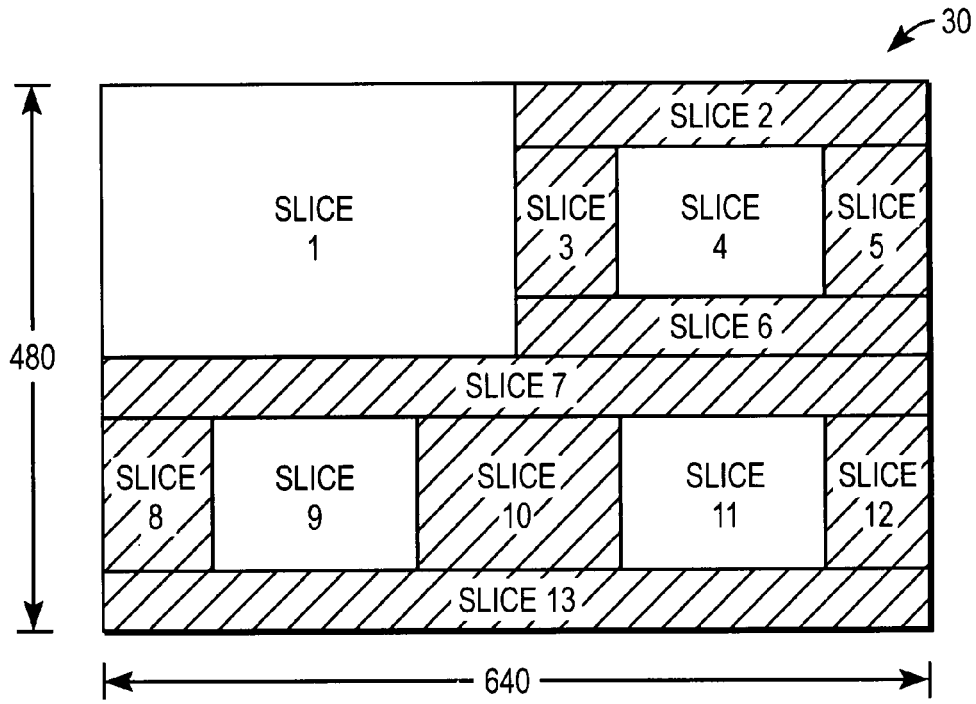
FIG. 3B illustrates an example set of slice groups encoded for the composite picture of FIG. 3A.

FIG. 3B illustrates an example set of slice groups encoded for the composite picture 30 of FIG. 3A. Note that Slice 1 encodes the image from $Source_1$, Slice 4 encodes the image from $Source_2$, Slice 9 encodes the image from $Source_3$, and Slice 11 encodes the image from $Source_4$. The remaining slice groups (Slices 2-3, 5-8, 10 and 12-13) comprise pad slice groups encoded to provide a background or fill color for the smaller (160×120) images.

In certain embodiments, in addition to encoding the pad slice groups with a simple, constant image, the pad slice groups may be keyed with a distinct pattern that readily identifies them as pad areas. This keying may include a small number of PCM-encoded macroblocks that have a unique pattern indicating that they comprise padding for the source pictures. A simple decoder could render these pad slice groups with only minor defects to the pad image. An enhanced or more sophisticated decoder could detect these keyed slice groups and recognize that all other slice groups were individually composed images. This would allow the decoder to scale and render each of the composed slice groups independently, producing an enhanced rendering.

Figure 4A:
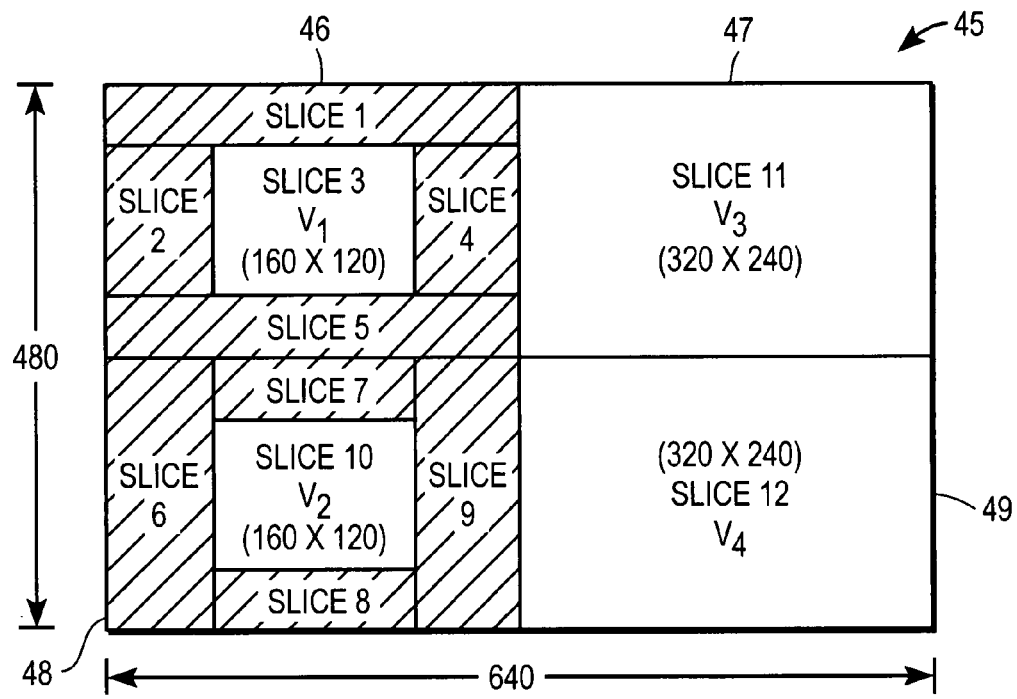
FIG. 4A illustrates an example set of slice groups encoded by a compositor to create a picture from four incoming video bitstreams.

FIG. 4A illustrates an example set of slice groups organized in such a way as to create a large, composite picture 45 from four smaller incoming video bitstreams. Picture 45 may be output by a compositor as a single video bitstream sent to one or more receiver devices. The picture images of each of the four incoming video bitstreams are shown as slice group 3, which is a 160×120 image ($V_1$), slice group 10, another 160×120 image ($V_2$), slice group 11, a 320×240 image ($V_3$), and slice group 12, another 320×240 image ($V_4$). The pad slice groups added to picture 45 by the compositor may be encoded to produce a uniform background (e.g., a color or blank region) around the smaller $V_1$ and $V_2$ images. That is to say, slice groups 1, 2, 4 & 5 comprise pad slice groups that provide a background area for video image $V_1$ (slice group 3) and slice groups 6, 7, 8 & 9 comprise pad slice groups that provide a background area for video image $V_2$ (slice group 10).

It should be understood that the pad slice groups in a composite image may be produced using FMO in various rectilinear shapes, not limited to rectangles. Practitioners in the art will appreciate that FMO consists of multiple different types of patterns that may be utilized to mark macroblock areas of interest.

Figure 4B:
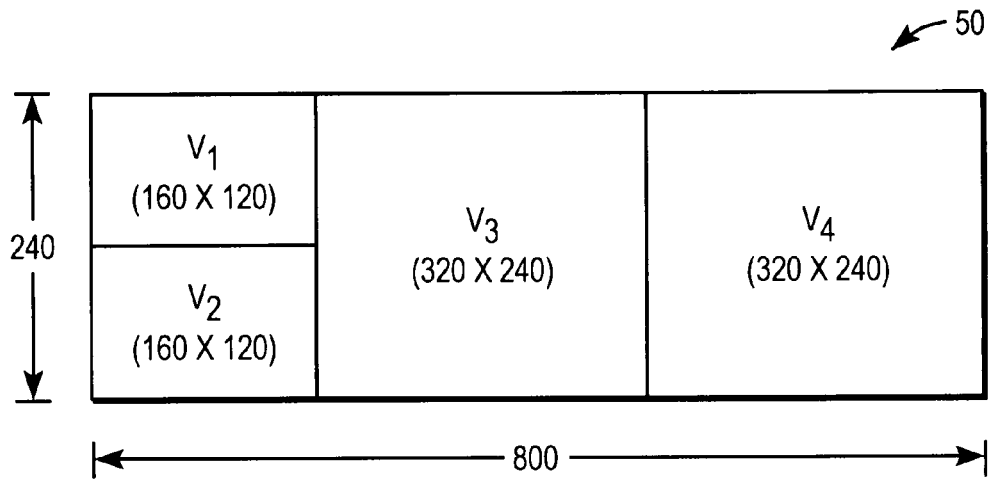
FIG. 4B illustrates an example picture produced as a single video bitstream containing the respective incoming video image slice groups shown in FIG. 4A.
Figure 4C:
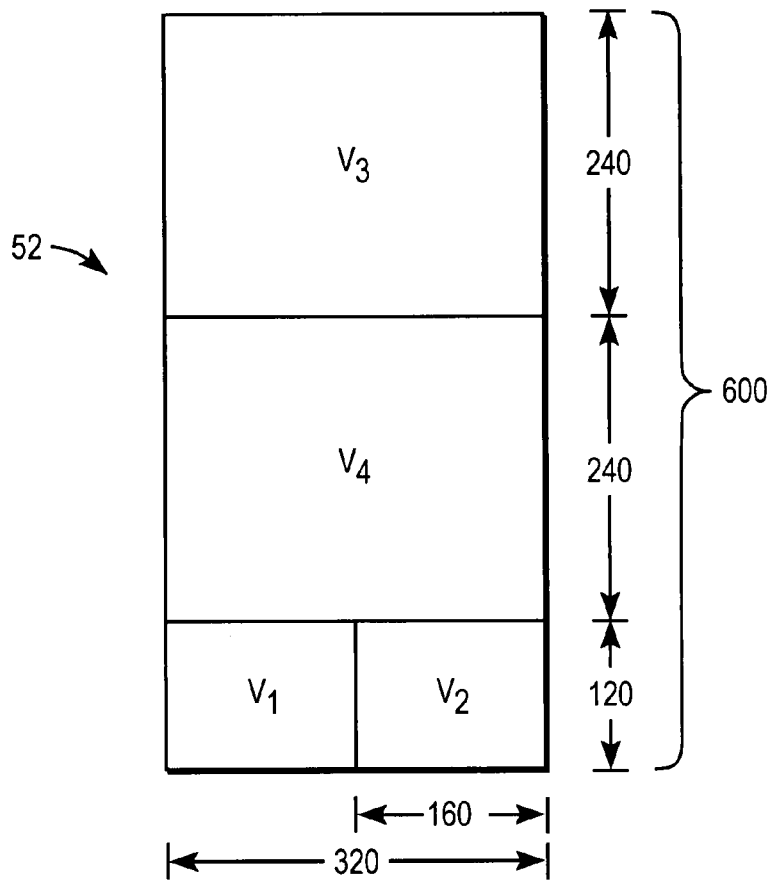
FIG. 4C illustrates another example picture produced as a single video bitstream containing the respective incoming video image slice groups shown in FIG. 4A.

FIG. 4B illustrates an example picture 50 produced from the video image slice groups shown in FIG. 4A. Picture 50 may be generated by a video codec capable of receiving a single transport bitstream that includes the slice groups shown in FIG. 4A. Here, the decoder has discarded the pad slice groups and arranged video image $V_1$ above $V_2$ on the left-hand side of the picture, with image $V_3$ in the middle, and $V_4$ on the right-hand side. In this arrangement, composite picture 50 has a size of 800×240 pixels FIG. 4C illustrates another example picture 52 produced from the video image slices shown in FIG. 4A. In this example, the decoder has arranged video image $V_3$ on top, above $V_4$, with images $V_1$ and $V_2$ being arranged side-by-side on the bottom of the picture. In this arrangement, composite picture 50 has a size of 320×600 pixels.

Figure 5:
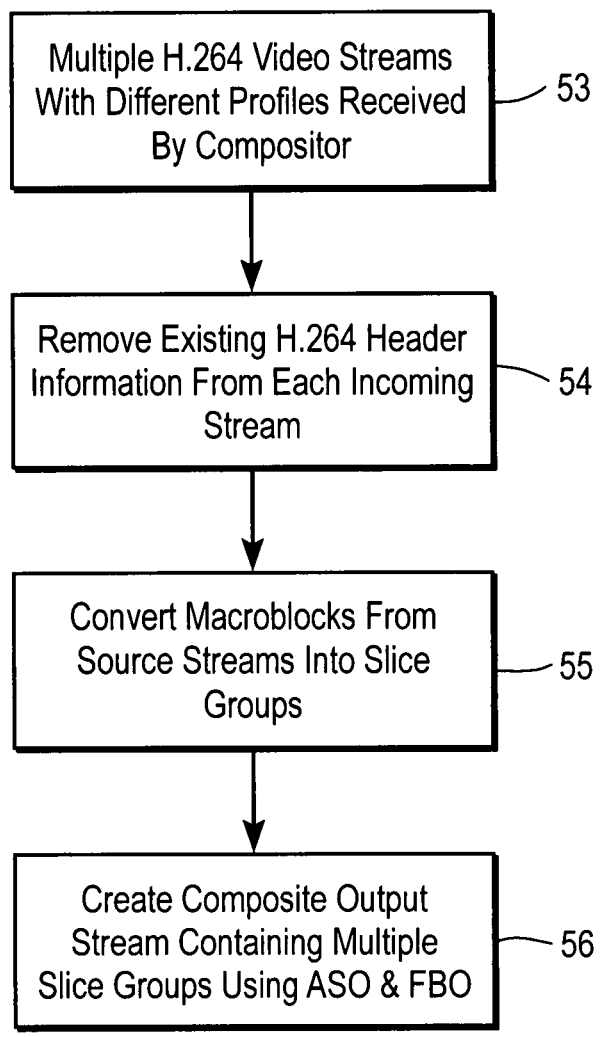
FIG. 5 illustrates an example method of operation for the compositor shown in FIG. 1.

FIG. 5 illustrates an example method of operation for the compositor shown in FIG. 1. The process begins with multiple H.264 video streams, each having different profiles (e.g., some AVC and others SVC, with a variety of resolutions and frame rates), being ingested by the compositor (block 53). The compositor basically converts each of these streams into a separate slice groups using FMO, and then outputs them as a single stream using ASO. That is, the multiple incoming video bitstreams are organized into a single bitstream comprising a composite picture that contains the multiple ingested video bitstreams.

To achieve that result, the compositor first removes the existing H.264 header information from each of the incoming streams (block 54). Once the incoming H.264 headers have been stripped, the compositor converts the macroblocks from the source streams into slice groups (block 55). Each of the source video images may comprise a single slice; however, as the separate source images are composed into a larger picture, pad slice groups may need to be added to create a rectangular composite picture size compatible with a certain output display format. The slice groups are then reordered into a single composite output stream with an appropriate slice group header using FMO and ASO techniques (block 56). As discussed previously, an H.264/AVC compliant decoder receiving the output stream may simply render the composite picture as a large rectangle with the given padding area arrangement. More advanced decoders may have the ability to recognize the padding information contained in the output stream, select the active video portions, and either display them separately or arrange them into a different display format.

In another embodiment, the video compositor that formats the incoming streams into slice groups creates a picture parameter set with new (e.g., proprietary) fields that attach scaling parameters to each slice group. These scaling parameters may instruct the decoder to render the slice groups—irrespective of their current width and height—as an image that is N macroblocks wide by M macroblocks high where N and M are integers. The scaling parameters may also indicate to the decoder whether a picture should be stretched, cropped, filled, or some combination thereof, to achieve a new scaled format. The slice groups are then placed at specific coordinates using FMO and ASO techniques. The slice groups, however, do not have to add up to an image that creates a rectangle. Instead, the scaling parameters would ensure that the decoder scale the individual slice groups to a rectangle.

Figure 6:
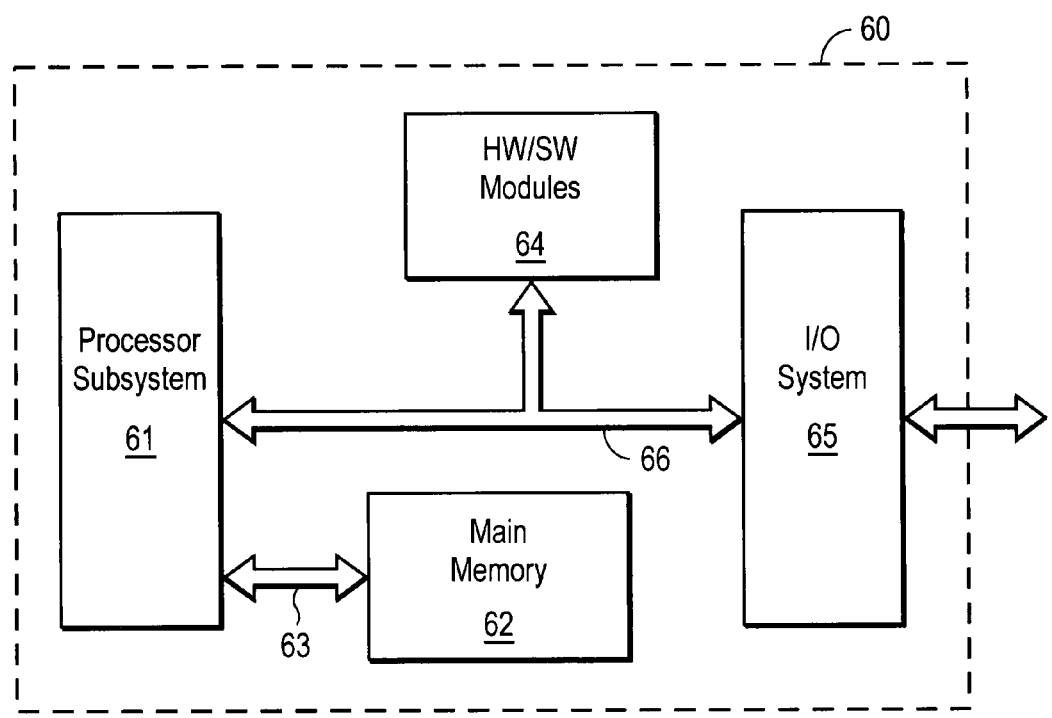
FIG. 6 illustrates basic components of an example node or network device.

FIG. 6 illustrates basic components of an example network device or node 60 (e.g., a compositor or receiver device). Node 60 typically comprises a number of basic subsystems that includes a processor subsystem 61, a main memory 62 and an input/output (I/O) subsystem 65. Data is transferred between main memory ("system memory") 62 and processor subsystem 61 over a memory bus 63, and between the processor and I/O subsystems over a system bus 66. Examples of the system bus may include the conventional lightning data transport (or hyper transport) bus and the conventional peripheral component interconnect (PCI) bus. Node 60 may also comprise other hardware units/modules 64 coupled to system bus 46 for performing additional functions. Processor subsystem 61 may comprise one or more processors and a controller device that incorporates a set of functions including a system memory controller, support for one or more system buses and direct memory access (DMA) engines.

It should be understood that elements of the present invention may also be provided as a computer program product which may include a machine-readable medium having stored thereon instructions which may be used to program a computer (e.g., a processor or other electronic device) to perform a sequence of operations. Alternatively, the operations may be performed by a combination of hardware and software. The machine-readable medium may include, but is not limited to, floppy diskettes, optical disks, CD-ROMs, and magneto-optical disks, ROMs, RAMs, EPROMs, EEPROMs, magnet or optical cards, propagation media or other type of media/machine-readable medium suitable for storing electronic instructions. For example, elements of the present invention may be downloaded as a computer program product, wherein the program may be transferred from a remote computer or telephonic device to a requesting process by way of data signals embodied in a carrier wave or other propagation medium via a communication link (e.g., a modem or network connection).

Additionally, although the present invention has been described in conjunction with specific embodiments, numerous modifications and alterations are well within the scope of the present invention. Accordingly, the specification and drawings are to be regarded in an illustrative rather than a restrictive sense.

We claim:

1. A method comprising:
    receiving, by a compositor, a plurality of N H.264-compliant source video streams, where N is an integer greater than one;
    converting each of the N source video streams into source slice groups using flexible macroblock ordering (FMO);
    compositing the slice groups to create a sequence of composite pictures, wherein the sequential progression of compositing pictures from the source video streams is according to pictures having a presentation time within a time interval corresponding to the composition operation;
    adding pad slice groups to the source slice groups to create a composite image compatible with an H.264/AVC standard, wherein the pad slice groups are added to create a rectangular composite picture size compatible with an output display format, and wherein the pad slice groups are keyed with a distinct pattern indicative of padding for the composite pictures; and
    reordering the source slice groups and pad slice groups into a single composite output stream.

2. The method of claim 1 wherein each of the H.264-compliant source video streams has a different picture profile.

3. The method of claim 1 wherein the plurality of H.264-compliant source video streams includes at least one H.264/SVC stream.

4. The method of claim 1 wherein the plurality of H.264-compliant source video streams includes one or more H.264/AVC streams and one or more H.264/SVC streams.

5. The method of claim 1 wherein the composite image is rectangular in shape and includes source images of each of the source video streams.

6. The method of claim 1 wherein the composite image is rectangular in shape and has a size that is larger than that of any of the source images.

7. The method of claim 1 further comprising removing H.264 header information from each of the source video streams.

8. The method of claim 1 wherein the reordering is achieved using arbitrary slice ordering (ASO).

9. The method of claim 1 further comprising rendering, by a decoder, the composite image as a large rectangular picture that includes one or more padding areas defined by the pad slice groups.

10. The method of claim 5 further comprising keying the pad slice groups with a pattern that identifies the pad slice groups as padding for the source images.

11. The method of claim 5 further comprising:
    receiving, by a decoder, the single composite output stream;
    recognizing the pad slice groups; and
    selecting the source images, and either: displaying each of the source images separately, or arranging the source images into a different display format.

12. A method comprising:
    formatting, by a compositor, a plurality of N source video streams, where N is an integer greater than one, into slice groups;
    compositing the slice groups to create a sequence of composite pictures, wherein the sequential progression of compositing pictures from the source video streams is according to pictures having a presentation time within a time interval corresponding to the composition operation;
    adding pad slice groups to the source slice groups, wherein the pad slice groups are added to create a rectangular composite picture size compatible with an output display format, and wherein the pad slice groups are keyed with a distinct pattern indicative of padding for the composite pictures;
    reordering the source slice groups and pad slice groups; and
    creating a picture parameter set (PPS) that includes scaling parameters attached to each of the slice groups, the scaling parameters including rendering information that instructs a decoder to scale the slice groups into a format that produces a rectangular composite image.

13. The method of claim 12 wherein the format is compatible with an H.264 standard.

14. The method of claim 12 further comprising placing the slice groups at specific coordinates using flexible macroblock ordering (FMO) and arbitrary slice ordering (ASO) techniques.

15. Logic encoded in one or more devices for execution and when executed is operable to:
    receive a plurality of N source video streams, where N is an integer greater than one, at least two of the source video streams having different profiles;
    convert each of the N source video streams into source slice groups using flexible macroblock ordering (FMO);
    composite the slice groups to create a sequence of composite pictures, wherein the sequential progression of compositing pictures from the source video streams is according to pictures having a presentation time within a time interval corresponding to the composition operation;
    add pad slice groups to the source slice groups to create a composite image, wherein the pad slice groups are added to create a rectangular composite picture size compatible with an output display format, and wherein the pad slice groups are keyed with a distinct pattern indicative of padding for the composite pictures; and
    reorder the source slice groups and pad slice groups into a single composite output stream using arbitrary slice ordering (ASO).

16. The logic of claim 15 wherein the composite image has a format compatible with an H.264 standard.

17. The logic of claim 15 wherein the composite image is rectangular in shape and includes source images of each of the source video streams.

18. The logic of claim 15 wherein the plurality of source video streams includes one or more H.264/AVC streams and one or more H.264/SVC streams.

19. The logic of claim 13 further operable to remove header information from each of the source video streams.

20. A system comprising:
    a compositor operable to receive a plurality of source video streams, each containing source images, and to convert each of the source video streams into source slice groups using flexible macroblock ordering (FMO), the compositor being further operable to add pad slice groups to the source slice groups to create a sequence of composite images, the compositor reordering the source slice groups and pad slice groups into a single composite output stream, wherein the sequential progression of compositing images from the source video streams is according to pictures having a presentation time within the time interval corresponding to the composition operation, wherein the pad slice groups are added to create a rectangular composite image size compatible with an output display format, and wherein the pad slice groups are keyed with a distinct pattern indicative of padding for the composite images; and a device operable to receive the single composite output stream and display the composite image as a rectangular picture that has a size larger than that of any of the source images.

21. The system of claim 20 wherein the device is further operable to recognize the pad slice groups, select the source images, and either display each of the source images separately, or arrange the source images into a different display format.

* * * * *